Oct. 30, 1928.
G. B. ROLFE
1,689,934
ELECTRIC GENERATOR
Filed April 17, 1923
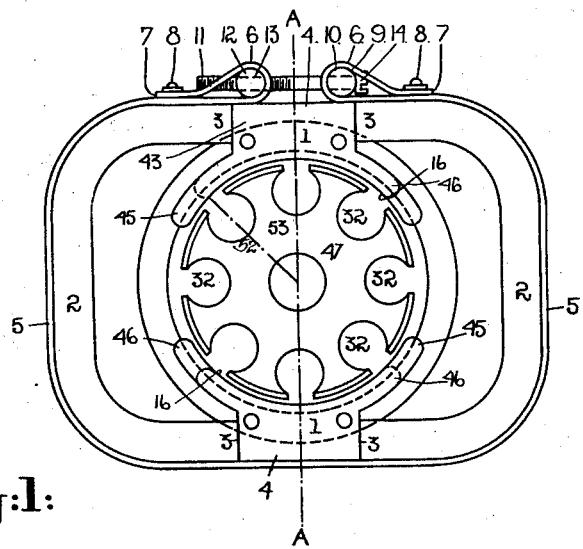
Fig:1:
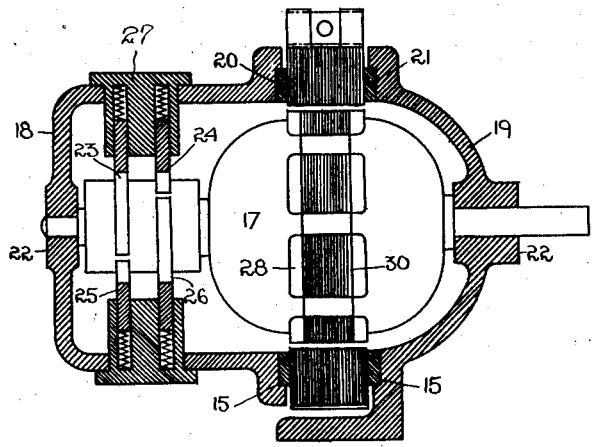
Fig:2:
INVENTOR:
George B. Rolfe
BY Wm Wallace White
ATT'Y.

Patented Oct. 30, 1928.

1,689,934

UNITED STATES PATENT OFFICE.

GEORGE BERKELEY ROLFE, OF LONDON, ENGLAND, ASSIGNOR TO EVERSHED & VIGNOLES, LIMITED, OF LONDON, ENGLAND.

ELECTRIC GENERATOR.

Application filed April 17, 1923, Serial No. 632,596, and in Great Britain May 17, 1922.

This invention relates to improvements in magneto electric generators and has for its object a construction whereby a machine of light weight, high duty, and comparatively low cost of manufacture can be readily obtained and a machine in which concentricity of the armature and the pole faces of the field magnet system is always obtained.

Referring to the drawings, which form part of this specification—

Figure 1 is a front elevation of one form of magneto electric machine in which a pole piece unit constructed in accordance with this invention is employed, the front bearing bracket being removed to expose the armature.

Figure 2 is a transverse section of Fig. 1 taken on the line A—A showing how the unit locates the armature bearings.

Referring to Fig. 1, which illustrates a form of machine constructed in accordance with this invention, the field magnet system comprises pole pieces 1, 1 and permanent magnets 2, 2 arranged as a magnetic system. The ends 3, 3, 3, 3 of the permanent magnets 2, 2 contact on either side of the pole pieces 1, 1 with abutments formed by projections 4, 4 on the said pole pieces 1, 1 and are maintained in this position by a band 5. The ends of the band 5 are turned into loops 6, 6 the ends 7 of the band 5 being riveted to the main part of the band by rivets 8.

Within one of these loops 6 is disposed a transverse member 9 having a hole 10 through which the screw 11 passes, the other loop 6 having a transverse member 12 with a threaded hole 13 for receiving the threaded end of the screw 11. The loop 6 containing the transverse member 9 is slightly cut away to enable the head 14 of the screw 11 to be turned by a suitable instrument, the back surface of the head 14 serving as an abutment to exert pressure on the band when turned; obviously, any analogous construction may be employed to retain the pole pieces 1, 1 and field magnets 2, 2 in the correct relation.

The pole pieces 1, 1 are associated in proper relation the one to the other by riveting or otherwise securing them to two members 15, 15 (see Fig. 2) of non-magnetic material, said members in some cases and as illustrated being in the form of flat rings. Alternatively, portions only of rings may be equally well employed to locate the pole pieces 1, 1 in proper relation to one another. As illustrated, the members 15, 15 of ring form are arranged concentrically with the polar faces 16, 16 of the pole pieces 1, 1.

To support the armature 17 bearing brackets 18 and 19 are provided said bearing brackets 18 and 19 being provided with recessed portions 20 and 21 respectively adapted on assembly with the pole pieces 1, 1 to engage with the ring-like members 15, 15 aforesaid.

Obviously, when these members 15, 15 are of ring form as illustrated or are portions of rings and the recesses 20 and 21 are concentric with the bearings 22, 22, the bearings 22, 22 will be concentric with the polar faces 16, 16.

Referring to Fig. 2, it will be seen that suitable brushes 23, 24, 25 and 26, are carried in housings 27 mounted on the bearing bracket 18. Instead of mounting all the brushes in housings 27 carried by the bearing bracket 18, some of the brushes may be carried in housings supported by the bearing bracket 19 as is found most convenient.

The brushes are provided with suitable conductors for conveying the current collected thereby in well-known manner suitable insulating means being provided.

Although for simplicity of description permanent magnets have been illustrated and referred to obviously electromagnets or permanent with a winding may be employed without departing from the scope of the invention.

I claim:—

In a dynamo electric machine, a pole piece unit having in combination two laminated pole pieces, two locating rings of non-magnetizable material rigidly and permanently connected to said pole pieces, said rings each having a circular external perimeter, and armature bearing brackets having recessed portions cooperating with said circular perimeters for definitely locating the polar faces of the unit relative to the armature axis of the machine.

In testimony whereof I have signed my name to this specification.

GEORGE BERKELEY ROLFE.